Aug. 19, 1952   W. G. MILLER   2,607,369
FLOW CONTROL DEVICE
Filed Sept. 15, 1949
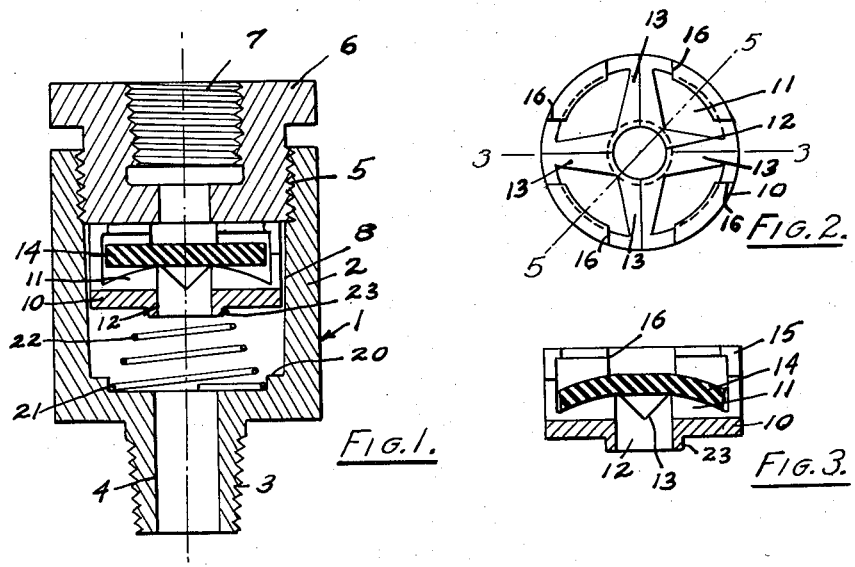
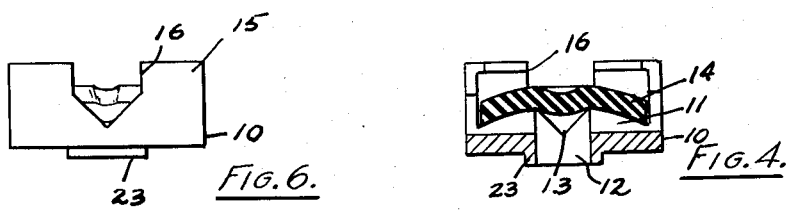
Inventor
WESLEY G. MILLER
By
Florian G. Miller
Attorney Patented Aug. 19, 1952

2,607,369

UNITED STATES PATENT OFFICE 2,607,369

FLOW CONTROL DEVICE

Wesley G. Miller, Erie, Pa., assignor to Hays Manufacturing Company, Erie, Pa., a corporation of Pennsylvania Application September 15, 1949, Serial No. 115,870

10 Claims. (Cl. 138—43)

This invention relates generally to flow control devices for controlling the flow of fluid through a pipe line which varies in pressure and temperature. This application sets forth an improvement of the flow control device in my Patent 2,460,647.

Prior flow control devices have been suitable for pressures above fifteen or twenty pounds per square inch, but they have proved unsatisfactory in fluid lines where there is a small volume and the pressure gets as low as three to five pounds per square inch. Where prior flow control devices have been designed for extremely low pressure fluid lines, they have been too delicate to control the flow of fluid in the high pressure range.

It is, accordingly, an object of my invention to overcome the above and other defects in present flow control devices and it is more particularly an object of my invention to provide a flow control device which is simple in construction, economical in cost, efficient in operation, and economical in manufacture.

Another object of my invention is to provide a flow control device in a fluid line which controls the quantity of fluid passing therethrough regardless of the variations in temperature or pressure of the fluid.

Another object of my invention is to provide a fluid control device in a fluid line which provides means for initially controlling the flow of fluid in a fluid line when the pressure of the fluid is negligible and which also efficiently controls the flow of fluid in the high pressure range.

Another object of my invention is to provide a flow control device which has a maximum useful life and which controls the flow of fluid over a wide pressure and temperature range.

Another object of my invention is to provide a flow control device which permits a maximum flow of fluid while controlling the flow of fluid through a fluid line.

Other objects of my invention will become evident from the following detailed description, taken in conjunction with the accompanying drawings, in which Fig. 1 is a vertical sectional view of a flow control device illustrating a preferred embodiment of my invention;

Fig. 2 is a plan view of the insert member in my novel flow control device removed from the flow control member shown in Fig. 1;

Fig. 3 is a view taken on the line 3—3 of Fig. 2 with the flow control washer shown in a deflected position during comparatively low pressure operation thereof;

Fig. 4 is a view taken on the line 3—3 of Fig. 2 showing the washer deflected by substantially higher pressures into a groove of the insert member to partially restrict the groove and offer greater resistance to the flow of fluid therethrough;

Fig. 5 is a view taken on the line 5—5 of Fig. 2; and

Fig. 6 is a side elevational view of the insert member.

Referring now to the drawings, I show in Figs. 1 to 6 inclusive, as illustrative of one embodiment of my invention, a cylindrical flow control member 1 for disposal in a pipe line comprising a cylindrically shaped body 2 having an externally threaded extension 3 and an outlet aperture 4, and an internally threaded portion 5 for threadably engaging a threaded adapter 6 having a threaded aperture 7 providing an inlet for the flow of fluid into the flow control member 1. The inner sides 8 of the member 1 are preferably slightly tapered with the sides thereof diverging outwardly away from the outlet end of the member 1.

An open, cup-shaped insert member 10 having a convex crown or face portion 11 with a central aperture 12 for alignment with the outlet 4 in flow control member 1 has radially extending, V-shaped grooves 13 extending outwardly from the aperture 12 in the convex face portion 11. A flat, cylindrically shaped, resilient elastic member 14 is disposed over the aperture 12 and grooves 13 in the convex portion 11 of the insert member 10 to control the flow of fluid passing from the inlet 7 to the outlet 4 of the flow control member 1. The insert member 10 has the upper wall portions 15 thereof cut away at 16 to permit lateral flow of fluid from the inlet 7 to pass around the outer side of the resilient member 14 through the grooves 13 and into the aperture 12 to the outlet 4 when the insert member 10 seats on the marginal shoulder 20 in the body 2 of the member 1. A recessed portion 21 in the lower portion of the body 2 of the member 1 is provided to nest a spiral coil spring 22 which engages a depending portion 23 on the under side of the insert member 10 as shown in Fig. 1. The spring 22 urges the insert 10 away from the shoulder 20 and outlet 4. The resilient member 14 is preferably made of a flexible resilient elastic material such as rubber or a rubber composition although any other suitable resilient material may be used. My device may even operate as a flow control device within predetermined limits with a flexible metal member 14.

Although I have shown an insert member 10 with a grooved convex surface 11, it will be evident that this surface may be a grooved flat surface.

In operation, the flow control member 1 is threadably engaged to suitable piping with the inlet pipe attached to the threaded inlet 7 and the outlet pipe threadably attached to the threaded exension 3. Fluid passing downwardly through the inlet aperture 7 strikes the upper side of the resilient member 14 wherein the fluid passes around the outer side of the insert member 10 to the outlet aperture 4. As the pressure increases, the insert member 10 is moved longitudinally against the force of the spring 22 until the insert member 10 seats on the shoulder 20. Because of the tapered inner sides 8 of the member 1, the annular orifice formed between the outer side of the insert member 10 and the inner side of the body 2 gradually decreases in size as it moves towards the shoulder 20 in the body 2. When the insert member 10 seats on the shoulder 20, all of the flow is then through the passage 13 in the insert member 10 and outwardly through the central aperture 12 thereof. As the pressure increases, the outer side of the resilient member 14 will gradually deflect downwardly to the maximum downward position shown in Fig. 3 thereby gradually restricting the radially extending apertures or grooves 13 leading to the aperture 12. Because of the convexity of the face 11, it will be evident that the cross sectional area of the grooves 13 decreases as they are gradually covered by the resilient member 14 radially outwardly from the central portion thereof. Inasmuch as there is a comparatively small amount of pressure required to deflect the outer side of the resilient member 14 downwardly, it will be evident that my flow control device will operate to control the flow of fluid when pressures are comparatively low. As the pressure further increases, the portions of the surface of the resilient member 14 are forced downwardly into the grooves 13 as shown in Fig. 4 to restrict the cross sectional area thereof and provide increased resistance to the flow of fluid therethrough. By changing the cross sectional area of the passages for the flow of fluid in proportion to the increase or decrease in pressure, the flow of fluid can be held substantially constant regardless of the pressure of the fluid passing through the flow control member 1.

My novel flow device controls the flow of fluid passing therethrough within very close limits even upon the passage of a comparatively small volume of fluid under a minimum pressure. Furthermore, my novel flow control device is so adapted that it will control the flow of fluids within very close limits with large volumes of fluid in the high pressure range. Because of the small portion of the resilient member 14 being forced into the grooves 13 and because there is some rotational movement of the resilient member 14 whereby different portions thereof move into the grooves 13, there is little change in the elasticity thereof even after it has been in operation for a considerable period of time. Changes in temperature of the fluid will not cause any decrease in efficiency in the control of the flow of the fluid in that the diameter of the resilient member 14 has no effect upon its ability to restrict the grooves 13.

It will be evident from the foregoing that I have provided a novel flow control device which is particularly adaptable for controlling the flow of a small volume of fluid at extremely low pressures and which is further adapted to control the flow of fluid in the high and intermediate pressure range.

Various changes may be made in the specific embodiment of my invention without departing from the spirit thereof or from the scope of the appended claims.

What I claim is:

1. A flow control device for varying pressure fluids comprising a hollow cylindrical member having an inlet and an outlet, an insert slightly smaller than the internal diameter of said hollow cylindrical member movable longitudinally of said member having a central aperture and radially extending grooved passages leading outwardly from said central aperture, said internal diameter of said cylindrical member being slightly larger than the diameter of said insert whereby fluid flows therebetween while said insert moves longitudinally in said cylindrical member between said inlet and said outlet therein, a resilient member disposed over said outlet aperture and said grooved passages in said insert in the path of fluid passing from the inlet of said member to the outlet thereof and a spring disposed between the outlet end of said member and said insert member for urging said insert away from said outlet end thereof.

2. A flow control device as set forth in claim 1 wherein the inner side of said flow control member is tapered divergently outwardly away from the outlet end thereof.

3. A flow control device for varying pressure fluids comprising a hollow cylindrical member having an inlet and an outlet aperture, a cup shaped insert adapted to move longitudinally in said member and to be disposed over said outlet aperture having a radially grooved portion with a central aperture for alignment with the outlet aperture in said member, said cylindrical member having a slightly larger internal diameter than the external diameter of said cup shaped insert whereby fluid flows therebetween when said cup shaped member is not disposed immediately over said outlet aperture in said cylindrical member, a resilient member for disposal over said aperture and said grooved pasages in said insert, and spring means for urging said insert away from the outlet end of said member.

4. A flow control device as set forth in claim 3 wherein the inner side of said member diverges outwardly away from the outlet end thereof.

5. A flow control device as set forth in claim 3 wherein said cup shaped member has the wall portions thereof cut away adjacent the outer ends of said grooved passages.

6. A flow control device for varying pressure fluids comprising a hollow cylindrical member having an inlet and an outlet aperture, an insert member longitudinally movable in said cylindrical member adapted to be disposed over said outlet aperture having a convex surface with a central aperture for alignment with said outlet aperture and tapered grooved passages extending radially outwardly therefrom, said insert member being cup shaped in form and having the terminal portions of said grooves cut away to permit free passage of fluid, a resilient member for disposal over said aperture and passages in said insert member adapted to be deflected upon an increase in pressure to progressively restrict the cross sectional area of said passages to the flow of fluid, and spring means for urging said insert member away from the outlet end of said flow control member.

7. A flow control device as set forth in claim 6 wherein the cross sectional area of said passages decreases progressively outwardly from the central aperture in said insert member.

8. A flow control device comprising a hollow cylindrical member having an inlet aperture on one end thereof and an outlet aperture on the opposite end thereof, and an inner side tapered convergently towards said outlet, a cylindrical insert member in the path of the flow of fluid from said inlet aperture to said outlet aperture therein, an elastic member mounted on said insert member to control the flow of fluid through said cylindrical member, and a spring for urging said insert member away from said outlet end of said cylindrical member.

9. A flow control device as set forth in claim 8 wherein said insert member has a central aperture and radially extending grooves and said elastic member disposed over the aperture and grooves in said insert member.

10. A flow control device comprising a hollow cylindrical member having an apertured inlet end and an apertured outlet end, a resilient cylindrical flow control member disposed for longitudinal movement in said cylindrical member having a diameter less than the inner diameter of said cylindrical member whereby fluid flows therebetween, said flow control member partially controlling the flow of fluid past said flow control member while it is between said inlet and said outlet aperture and completely controlling the flow of fluid thereby when it is seated on the outlet end of said cylindrical member, and a spring for urging said flow control member away from said outlet end of said cylindrical member.

WESLEY G. MILLER.

REFERENCES CITED

The following references are of record in the file of this patent:

UNITED STATES PATENTS

| Number | Name | Date |
|---|---|---|
| 2,460,647 | Miller | Feb. 1, 1949 |
| 2,508,793 | Miller | May 23, 1950 |
| 2,517,154 | Wolf | Aug. 1, 1950 |